United States Patent
Fujiura et al.

[11] Patent Number: 5,838,863
[45] Date of Patent: Nov. 17, 1998

[54] CABLE SEALED WITH A POLYURETHANE RESIN AND SEALING PROCESS OF THE SAME

[75] Inventors: Yoji Fujiura, Kyoto-fu; Yukio Zenitani, Nara-ken; Masami Koike, Osaka-fu, all of Japan

[73] Assignee: Sanyo Chemical Industries, Ltd., Kyoto, Japan

[21] Appl. No.: 794,817

[22] Filed: Feb. 4, 1997

[30] Foreign Application Priority Data

Feb. 15, 1996 [JP] Japan ................................. 8-054190

[51] Int. Cl.$^6$ ........................................................ G02B 6/44
[52] U.S. Cl. ................................................ 385/103; 385/105
[58] Field of Search ........................................ 385/100–114

[56] References Cited

U.S. PATENT DOCUMENTS

| | | | |
|---|---|---|---|
| 4,720,165 | 1/1988 | Tokuda et al. | 350/96.24 |
| 4,726,649 | 2/1988 | Funaki et al. | 350/96.23 |
| 5,217,808 | 6/1993 | Cobb | 385/100 |
| 5,463,711 | 10/1995 | Chu | 385/101 |
| 5,672,640 | 9/1997 | Brauer | 385/100 |

FOREIGN PATENT DOCUMENTS

| | | |
|---|---|---|
| 0 129 977 | 1/1985 | European Pat. Off. |
| 0 530 481 | 3/1993 | European Pat. Off. |
| 2 316 263 | 1/1977 | France |
| 1 520 529 | 11/1969 | Germany |
| 2-33116 | 2/1990 | Japan |
| 3-031390 | 2/1991 | Japan |
| 3-31390 | 2/1991 | Japan |
| 1 098 156 | 1/1968 | United Kingdom |
| WO 96/12767 | 5/1995 | WIPO |

*Primary Examiner*—Hung N. Ngo
*Attorney, Agent, or Firm*—Merchant, Gould, Smith, Edell, Welter & Schmidt

[57] ABSTRACT

This invention relates to a cable whose inner opening space has been sealed with a polyurethane resin formed with a polyurethane resin-forming sealing material comprising components (A) and (B). (A): a component comprising a dispersion (1) of a water-insoluble water absorbent resin (D) or its hydrogel in a polyol (C), wherein said resin (D) is formed by polymerizing in the polyol (C) a water soluble monomer or its precursor and crosslinking agent and/or polysaccharide; and (B): a component comprising an organic polyisocyanate (2); and sealing process of the same. This invention provides a cables having an excellent water preventing property without the risk of falling-off of the sealing material at the time of cable connection.

9 Claims, 1 Drawing Sheet

CABLE SEALED WITH A POLYURETHANE RESIN AND SEALING PROCESS OF THE SAME

BACKGROUND OF THE INVENTION

1. Field of the Invention

The present invention relates to a cable such as an optical fiber cable and an electric cable sealed with a polyurethane resin and sealing process of the same. More specifically, it relates to a cable sealed with a polyurethane resin sealing material capable of effectively preventing the entry and penetration of water stream into an optical fiber cable or an electric cable, and also relates to a sealing process of an optical fiber cable and an electric cable filled.

2. Description of the Prior Art

In recent years, since optical fiber cables and electric cables tend to be buried in the ground, high water-resistance is required therein. The water-resistance means that when a cable sheath is broken, preventing water penetration into opening space inside of the cable. Conventional examples of methods for preventing the entry and penetration of water stream into a cable include:

① a method of filling a jelly-like material into a cable;

② a method of filling a water-insoluble water-absorbent resin powder such as a partially-crosslinked polyacrylic acid salt into an opening space between the cable sheath and optical fiber etc. of a cable;

③ a method of using a water-sealing material obtained by retaining a water-absorbent resin on a substrate with a water-soluble solvent-type adhesive as disclosed in JP-A-2-33116; and ④ a method of using a water-sealing material obtained by fixing a water-absorbent resin on a substrate with a rubber-type binder as disclosed in JP-A-3-31390.

However, the methods of ① filling a jelly-like material into a cable and ② filling a water-insoluble water-absorbent resin powder have a drawback since the material filled into the cable is liable to fall off during a work for cable connection, resulting in inferior operation.

On the other hand, methods of ③ using a water-sealing material obtained by retaining a water-absorbent resin on a substrate with a water-soluble solvent-type adhesive and ④ using a water-sealing material obtained by fixing a water-absorbent resin on a substrate with a rubber-type binder have a problem since a film of a water-soluble resin or a rubber-type binder is formed on the surface of the water-absorbent resin so that water absorption by the water-absorbent resin is prevented and thus a sufficient water sealing property cannot be achieved.

SUMMARY OF THE INVENTION

It is an object of the present invention to provide a cable sealed with sealing material having excellent water resistance without the risk of falling-off of the sealing material at the time of connecting cables for an optical fiber cable and electric cable, and also to provide a sealing process of the cables.

That is, the present invention relates to a cable whose inner opening space has been sealed with a polyurethane resin formed with a polyurethane resin-forming sealing material comprising components (A) and (B):

(A): a component comprising a dispersion (1) of a water-insoluble water absorbent resin (D) or its hydrogel in a polyol (C), wherein said resin (D) is formed by polymerizing in the polyol (C) a water soluble monomer or its precursor and crosslinking agent and/or polysaccharide; and (B): a component comprising an organic polyisocyanate (2).

The present invention further relates to a sealing process of an opening space inner a cable comprising mixing components (A) and (B) as described above and introducing the resulted mixture into said opening space under pressure, followed by curing to form a polyurethane resin, whereby sealing the opening space.

Further more, the present invention relates to a sealing process of an opening space inner a cable comprising inserting a string-like or tape-like molded polyurethane formed with the polyurethane resin-forming sealing material as described above, whereby sealing the opening space.

DESCRIPTION OF THE PREFERRED EMBODIMENTS

Figure 1:
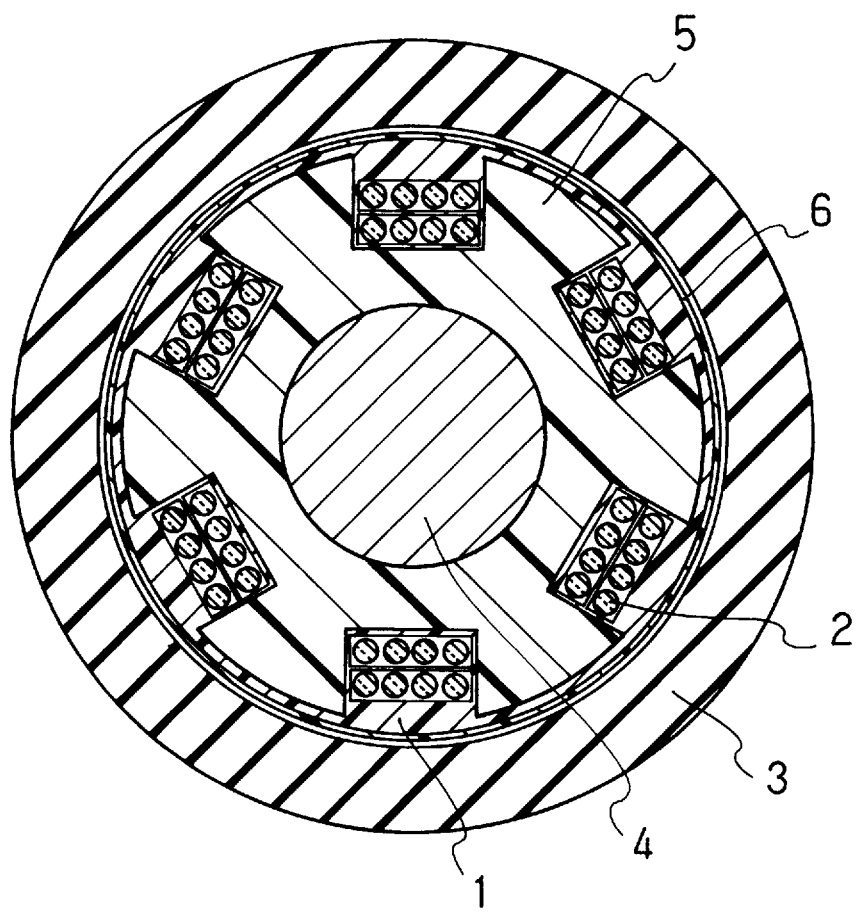
FIG. 1 is a cross-sectional view of a slot-type water stream prevention type optical fiber cable of an embodiment provided with a sealing material of the present invention.

Examples of polyols (C) comprising a dispersion (1) in the component (A) of the present invention include polyether polyols, polyester polyols, polyols having the principal chain formed by a C—C bond (carbon-carbon bond), and other compounds disclosed in the "Polyurethane Resin Handbook edited by Keiji Iwata published by Nikkan Kogyo Shinbun Co., Ltd. in 1987". Furthermore, etherified products and esterified products having hydroxyl groups partially substituted by alcohol or carboxylic acid are also included. Among these examples, polyether polyols and polyester polyols are preferable.

Examples of polyether polyols include polyoxyalkylene polyols. Examples of the polyoxyalkylene polyols include those obtainable by addition of alkylene oxide to compounds containing at least two (preferably those having two to eight) active hydrogen atoms, such as polyhydric alcohols, polyhydric phenols, amines, polycarboxylic acids, phosphoric acids and compounds containing a thiol group, and mixtures thereof. Among these examples of compounds containing active hydrogen atoms, polyhydric alcohols are preferable.

Examples of polyhydric alcohols include dihydric to octahydric alcohols. Examples of dihydric alcohols include diols such as alkylene glycols including ethylene glycol, diethylene glycol, propylene glycol, 1,3- or 1,4-butane diol, 1,6-hexane diol, and neopentyl glycol, cyclohexane diol, xylylene glycol, and cyclic group-containing diols disclosed in the Japanese Patent Publication No. 45-1474. Examples of trihydric alcohols include glycerol, trimethylol propane, trimethylol ethane, hexane triol and triethanol amine. Examples of tetrahydric alcohols include pentaerythritol, methylene glucoside and diglycerol. Examples of alcohols having a functionality of 5 or higher include pentitols (such as adnitol, arabitol and xylitol) and hexitols (such as sorbitol, mannitol, iditol, talitol and dulcitol), saccharides, including monosaccharides (such as glucose, mannose, fructose and sorbose), oligo-saccharides (such as sucrose, trehalose, lactose and raffinose), glycosides, such as glucosides of polyols (for instance, glycols, such as ethylene glycol and propylene glycol, glycerol, trimethylolpropane and hexane triol); polyglycerols, such as triglycerol and tetraglycerol; and polypentaerythritols, such as dipentaerythritol and tripentaerithritol; and cycloalkane polyols, such as tetrakis(hydroxymethyl) cyclohexanol.

Examples of polyhydric phenols include monocyclic polyhydric phenols, such as pyrogallol, hydroquinone and phloroglucinol, and bisphenols, such as bisphenol A, and bisphenol sulfon, as well as phenol-formaldehyde condensation products (novolaks), such as polyphenols disclosed in the U.S. Pat. No. 3,265,641.

Examples of amines include ammonia, aliphatic amines, alicyclic amines, heterocyclic amines and aromatic amines. Examples of aliphatic amines include alkanol amines such as mono-, di- or tri-ethanol amines, isopropanol amines and aminoethylethanol amines; alkyl amines having a carbon number of 1 to 20; alkylene diamines having a carbon number of 2 to 6 (such as ethylene diamine, propylene diamine and hexamethylene diamine); polyalkylene amines (such as diethylene triamine and triethylene tetramine). Examples of alicyclic amines include isophorone diamine, cyclohexylene diamine and dicyclohexylmethane diamine. Examples of heterocyclic amines include aminoethylpiperazine and other heterocyclic amines disclosed in the Japanese Patent Publication No. 55-21044. Examples of aromatic amines include aniline, phenylene diamine, diamino toluene, xylylene diamine, methylene dianiline and diphenylether diamine.

Examples of polycarboxylic acids include aliphatic polycarboxylic acids such as adipic acid, succinic acid, sebacic acid, azelaic acid, fumaric acid, maleic acid, dimerized linolenic acid; and aromatic polycarboxylic acids such as phthalic acid, isophthalic acid and terephthalic acid.

Examples of compounds containing a thiol group include monothiols such as dodecyl mercaptan and mercaptopropionic acid; dithiols such as hexanedithiol and dimercapto-1,8dioxa-3,6-octane; polythiols such as reaction products of a polyglycidyl compound and hydrogen sulfide, esterified products of mercaptopropionic acid or mercaptoglycolic acid and polyhydric alcohol.

Examples of alkylene oxides (hereinafter referred to as AO) to be added to the above-mentioned compounds containing active hydrogen atoms, include ethylene oxide, propylene oxide (hereinafter referred to as EO and PO, respectively), 1,2-, 1,3-1,4-, or 2,3-butylene oxides, styrene oxide, and combinations thereof. Among these examples, preferred are propylene oxide and a combination of ethylene oxide and propylene oxide.

Methods of adding alkylene oxides to active hydrogen atom-containing compounds are not particularly limited. Examples of methods include a block addition and a random addition. Specific examples of combinations of PO and EO are shown below: block adducts, such as (1) adding PO followed by EO (tipped), (2) adding PO-EO-PO-EO in this order (balanced), (3) adding EO-PO-EO in this order, and (4) adding PO-EO-PO in this order (activated secondary); random adducts, such as (5) mixed-adding EO/PO; and random-block adducts, such as (6) adding PO-EO/PO-optionally PO-EO in this order as described in the JP-A-57-209920, and (7) adding EO/PO followed by EO, as described in the JP-A-53-13700. (In the above, EO/PO means a mixture of EO and PO.)

Examples of polyester polyols include condensation type polyester polyols, lactone type polyester polyols (polymerization type), and polycarbonate diols.

Examples of condensation type polyester polyols include products obtained by the dehydration-condensation-reaction of a dibasic acid and glycol or triol, such as ethylene adipate, diethylene adipate, butylene adipate, and trimethylol propane adipate.

Examples of lactone type polyester polyols include compounds obtained by ring-opening condensation of ε-caprolactam.

Examples of polycarbonate diols include compounds obtained by phosgenization of polyols or ester interchanging by diphenyl carbonate.

Examples of polyols having the principal chain of a C—C bond include acryl polyol, polybutadiene polyol and polyvinyl alcohol.

In the present invention, polyether polyols, polyester polyols, polyols having the principal chain of a C—C bond, low molecular weight polyols (such as the above-mentioned polyhydric alcohols, preferably those which are liquid in an ordinary temperature), and a combination thereof can be used.

Other examples of polyols (C) include products obtained by reacting a part of hydroxyl groups by alcohol or a carboxylic acid such as etherified products (including methyletherified products, isopropyl etherified products and phenyl etherified products) and esterified products (including acetate and benzoate).

A molecular weight of polyols (C) is in general, 100 to 100,000, preferably 500 to 50,000, more preferably 1,000 to 20,000.

When polyoxyalkylene polyol is used as (C), those having hydroxyl value of, in general, 5 to 280, preferably 10 to 200, more preferably 20 to 150 can be used.

Water-insoluble water-absorbent resins (D) used in the present invention are water-insoluble water-swellable resins.

Examples of water-soluble monomers to form water-insoluble water-absorbent resins (D) in the present invention include vinyl monomers having a carboxyl group, vinyl monomers having a sulfonic acid group, vinyl monomers having a cationic group, vinyl monomers having a phosphoric group, and salts thereof, vinyl monomers having a hydroxyl group, and vinyl monomers having an ether group.

Examples of vinyl monomers having a carboxyl group include (meth)acrylic acid, crotonic acid, sorbic acid, maleic acid, itaconic acid and cinnamic acid, and anhydrides of thereof. "(Meth)acryl-" herein denotes "acryl- and/or methacryl-".

Examples of vinyl monomers having a sulfonic acid group include aliphatic or aromatic vinyl sulfonic acids (including vinyl sulfonic acid, allyl sulfonic acid, vinyl toluene sulfonic acid and styrene sulfonic acid); (meth)acryl sulfonic acids (including sulfoethyl (meth)acrylate and sulfopropyl (meth)acrylate), and (meth)acrylamide sulfonic acids (including 2-acrylamide-2-methylpropane sulfonic acid).

Examples of vinyl monomers having a cationic group include monomers having a tertiary amino group or salt thereof, and monomers having a quaternary ammonium salt group. Examples of monomers having a tertiary amino group or salt thereof include dialkyl aminoalkyl (meth)acrylate (such as dimethyl amino ethyl (meth)acrylate); dialkyl amino hydroxy alkyl (meth)acrylate (such as dimethyl amino hydroxypropyl (meth)acrylate); dialkyl amino alkyl (meth)acrylamide (such as dimethyl amino ethyl (meth)acryl amide); dialkyl amino hydroxyalkyl (meth)acryl amide (such as dimethyl amino hydroxypropyl (meth)acryl amide); vinyl pyrrolidone; vinyl pyridine and a combination of two or more; and salts of these monomers and an acid (such as hydrochloric acid and hydrobromic acid). Examples of monomers having a quaternary ammonium salt group include reaction products of dialkyl amino alkyl (meth)acrylate and alkyl halide or dialkyl sulfate (such as (meth)acryloyl oxyethyl trimethyl ammonium chloride or bromide, (meth)acryloyl oxyethyl trimethyl ammonium methyl sulfate); reaction products of dialkyl amino hydroxy alkyl (meth)acrylate and alkyl halide or dialkyl sulfate (such as (meth)acryloyl oxy hydroxy ethyl trimethyl ammonium chloride); reaction products of dialkyl aminoalkyl (meth) acrylamide and alkyl halide or dialkyl sulfate (such as chlorides of trimethyl amino ethyl (meth)acrylamide); reaction products of dialkyl amino hydroxyalkyl (meth)acryl amide and alkyl halide or dialkyl sulfate (such as chlorides of diethyl methyl amino hydroxy propyl (meth)acrylamide); N-alkyl vinyl pyridinium halide (such as N-methyl-2-vinyl pyridinium chloride); and trialkyl allyl ammonium halide (such as dimethyl diallyl ammonium chloride).

Examples of vinyl monomers having a phosphoric group include 2-hydroxyethyl (meth)acryloyl phosphate and phenyl-2-acryloyloxy ethyl phosphate.

These vinyl monomers can be used in a form of salts of the above-mentioned carboxylic acids, sulfonic acids, and phosphoric acids. Examples of these salts include alkaline metal salts (such as salts of sodium, potassium or lithium), alkaline earth metal salts (such as salts of calcium or magnesium), ammonium salts and amine salts (such as salts of alkylamines including methyl amine and trimethyl amine; and salts of alkanol amines including triethanol amine and diethanol amine). Among these examples, alkaline metal salts are preferable, and sodium salts and potassium salts are particularly preferable.

Examples of vinyl monomers having a hydroxyl group include hydroxy ethyl (meth)acrylate and hydroxy propyl (meth)acrylate.

Examples of vinyl monomers having an ether group include ethylene glycol monomethyl ether (meth)acrylate and trioxy ethylene glycol (meth)acrylate.

Examples of precursors of water-soluble monomers include those which become water-soluble by hydrolysis such as methyl (meth)acrylate, ethyl (meth)acrylate, 2-ethyl hexyl (meth)acrylate, vinyl acetate and (meth) acrylonitrile.

These water-soluble monomers or precursors thereof can be used alone or in combinations of two or more.

Among these water-soluble monomers, vinyl monomers having a carboxyl group, vinyl monomers having a sulfonic acid group, and salts thereof are preferable.

In the present invention, other vinyl monomers can be used as needed for forming (D) in a range not disturbing the water absorption of (D). Examples of other vinyl monomers include aromatic vinyl monomers such as styrene, α-methyl styrene, hydroxy styrene, and chlorostyrene; unsaturated nitriles such as (meth)acrylonitrile; (meth)acrylic esters such as alkyl (meth)acrylate having an alkyl group of 1 to 30 carbon atoms and hydroxypolyoxyalkylene ether mono (meth)acrylate; olefins such as ethylene and propylene; fluorine-containing vinyl monomers such as perfluorooctyl ethyl (meth)acrylate; vinyl monomers having an amino group such as diamino ethyl methacrylate and morpholino ethyl methacrylate; and both-ends vinyl-modified silicons.

Among these examples, aromatic vinyl monomers, unsaturated nitriles and (meth)acrylic esters are preferable with respect to copolymerization and dispersion stability.

Examples of crosslinking agents used for forming (D) in the present invention include copolymerizable crosslinking agents and other crosslinking agents. Examples of copolymerizable crosslinking agents include compounds having at least two polymerizable double bonds; or compounds having at least one polymerizable double bond and at least one functional group reactive with the above-mentioned water-soluble monomers.

Examples of the above-mentioned compounds having two polymerizable double bonds include:

① bis(meth)acrylamide:
N,N'-alkylene bis(meth)acryl amides having an alkylene group of from 1 to 6 carbon atoms, such as N,N'-methylene bisacryl amide.

② di- or tri- (meth)acrylic esters and di- or tri- maleates derived from polyesters of polyols or polyepoxides (such as ethylene glycol, trimethylol propane, glycerol, polyoxy ethylene glycol, polyoxy propylene glycol or cyclohexane diepoxide) and unsaturated mono- or poly- carboxylic acid such as (meth)acrylic acid or maleic acid.

③ carbamyl ester:
carbamyl esters obtained by the reaction of hydroxyethyl (meth)acrylate and a polyisocyanate {such as tolylene diisocyanate, hexamethylene diisocyanate, 4,4'-diphenyl methane diisocyanate, and NCO group-containing prepolymers (obtained by the reaction of the above-mentioned polyisocyanates and a compound having an active hydrogen atom)}.

④ polyvinyl compound:
such as divinyl benzene, divinyl toluene, divinyl xylene, divinyl ether, divinyl ketone and trivinyl benzene.

⑤ di- or poly- (meth)allyl ether of polyols:
poly-(meth)allyl ether (such as polyethylene glycol diallyl ether, allylated starch and allylated cellulose) of polyols (such as alkylene glycol, glycerol, polyalkylene glycol, polyalkylene polyol and carbohydrate).

⑥ polyallylester of polycarboxylic acid:
such as diallyl phthalate and diallyl adipate.

⑦ ester of unsaturated mono- or poly- carboxylic acid and mono(meth)allyl ether of polyol:
such as (meth)acrylate of polyethylene glycol monoallyl ether.

⑧ allyloxy alkanes:
such as tetra allyloxy ethane.

Examples of groups reactive with a carboxyl group, a sulfonic acid group, a phosphoric acid group, a hydroxyl group, or an ammonium salt group in the compounds having at least one polymerizable double bond and at least one functional group reactive with the above-mentioned water-soluble monomers include a hydroxyl group, an epoxy group and a tertiary amine group. Specific examples of the crosslinking agents include ethylenically unsaturated compounds having a hydroxyl group (such as N-methylol (meth) acrylamide) and ethylenically unsaturated compounds having an epoxy group (such as glycidyl (meth)acrylate); ethylenically unsaturated compounds having a tertiary amino group (such as dimethyl amino ethyl (meth)acrylate and diethyl amino ethyl (meth)acrylate).

Examples of other crosslinking agents include polyvalent metal salts such as aluminum sulfate and zinc diacetate. Among these examples, copolymerizable crosslinking agents are preferable, and N,N'-methylene bisacryl amide, ethylene glycol diacrylate, trimethylol propane triacrylate and tetra allyloxy ethane are more preferable.

Examples of polysaccharides optionally used for forming (D) in this invention include starches and celluloses. Examples of starches include raw starches such as sweet potato starch, potato starch, wheat starch, corn starch and rice starch; and processed starches such as oxidized starch, dialdehyde starch, alkyl etherified starch, allyletherified starch, oxyalkylated starch and aminoethyl etherified starch.

Examples of celluloses include celluloses obtained from lumber, leaves, stalks, basts and seed fibers; and processed celluloses such as alkyl etherified cellulose, organic acid esterified cellulose, oxidized cellulose and hydroxyalkyl etherified cellulose.

The water-insoluble water-absorbent resin dispersions (1) can be obtained by any of the methods mentioned below. Hereinafter water-soluble monomers or precursors thereof are abbreviated as (a1), other vinyl monomers (a2), and crosslinking agents and/or polysaccharides (b).

① Drop a liquid of a polyol (C) optionally mixed with an emulsifier into an aqueous solution or aqueous dispersion of (a1), (b) and optionally (a2). Then optionally add a radical polymerization catalyst and heat or irradiate a radioactive ray, electron beam or ultraviolet ray.

② Drop an aqueous solution or aqueous dispersion of (a1), (b) and optionally (a2) into (C). Then optionally add a radical polymerization catalyst and an emulsifier and treat as in the item ①. "Treat as in the item ①" denotes polymerization by heating or irradiating with a radioactive ray, electron beam or ultraviolet ray.

③ Drop an aqueous solution or aqueous dispersion of (a1), (b), and optionally (a2) into a mixture of (C) and water. Then optionally add a radical polymerization catalyst and an emulsifier and treat as in the item ①.

④ Drop (a1), (b) and optionally (a2) into a dispersion comprising (C), an emulsifier and water optionally in the presence of a radical polymerization catalyst. Then treat as in the item ①.

The amount of (a1), (b) and (a2), if any, based on the weight of the polyol (C) is in general, 2 to 120%, preferably 10 to 100%, more preferably 30 to 90%.

The amount of (a1) based on the total weight of (a1), (b) and (a2), if any, is in general, 50% or more, preferably 60 to 99.9%, more preferably 75 to 95%.

The amount of (b) based on the total weight of (a1), (b), and (a2), if any, is in general, 0.001 to 20%, preferably 0.01 to 10%, more preferably 0.1 to 5%. The amount of (b) mentioned above provides excellent water absorbency of the sealing material of the invention.

The amount of another vinyl monomer (a2) based on the total weight of (a1), (b) and (a2), if any, is in general, 0 to 20%, preferably 0 to 10%, more preferably 0 to 5%.

The amount of water based on the weight of the dispersion (1) is 5 to 50%. Preferably, it is 5 to 45%, more preferably 10 to 30%. Taking above mentioned range of the amount of water, the production of the dispersion becomes easy.

Examples of radical polymerization catalysts in the production methods of the dispersion (1) as mentioned in the above items ① to ④ include azo compounds (such as azobisisobutyronitrile, azobiscyanovaleric acid and 2,2'-azobis(2-amidinopropane)dihydrochloride), inorganic peroxides (such as hydrogen peroxide, ammonium persulfate, potassium persulfate and sodium persulfate), organic peroxides (such as benzoyl peroxide, di-t-butyl peroxide, cumene hydro peroxide, succinic peroxide and di(2-ethoxy ethyl) peroxydicarbonate), and redox catalysts (such as those comprising a combination of a reducing agent (including a sulfite or a bisulfite salt of an alkali metal, ammonium sulfite, ammonium bisulfite and ascorbic acid), and an oxidizing agent (including persulfate of an alkali metal, ammonium persulfate and peroxides)); and a combination of two or more of these. The amount of the catalyst based on the total weight of (a1), (b) and (a2), if any, is in general, 0.0005 to 5%, preferably 0.001 to 2%.

Examples of emulsifiers include nonionic surface active agents such as lauryl alcohol ethylene oxide adducts, lauric acid ethylene oxide adducts, sorbitan lauric acid monoester, stearyl amine ethylene oxide adducts and nonylphenol ethylene oxide adducts; anionic surface active agents such as lauryl alcohol sulfuric ester, alkylbenzene sodium sulfonate, "Aerosol OT" (sodium dioctyl sulfo-succinate produced by CYTEC CO., LTD.) and dithiophosphate salts; cationic surface active agents such as lauryl amine acetate and triethanol amine monostearate formate; and a combination of two or more of these. Among these examples, nonionic surface active agents are preferable.

The amount of an emulsifier based on the dispersion is in general, 0 to 10 weight %, preferably 0.1 to 5 weight %.

The particle size of (D) or the hydro gel thereof in the dispersion (1) is, in general, 0.01 to 100 μm, preferably 0.05 to 10 μm, more preferably 0.1 to 5 μm. If the dispersion particle size is larger than 100 μm, the dispersion tends to be unstable. On the other hand, if it is smaller than 0.01 μm, the particles tend to agglomerate.

In the present invention, the ratio of (D) based on the total weight of (C) and (D) is, in general, 1 to 70%, preferably 5 to 65%, more preferably 20 to 60%. If the ratio of the vinyl polymer chain exceeds 70%, the dispersion tends to agglomerate and become unstable.

The ratio of (C) based on the weight of the dispersion is, in general, 30 to 99%, preferably 35 to 95%, more preferably 40 to 80% If the ratio of (C) is less than 30, the dispersion tends to agglomerate and become unstable.

In the present invention, as an organic polyisocyanate (2) in the component (B), any organic polyisocyanates conventionally employed for the production of polyurethanes can be used.

Suitable polyisocyanates include:

Aromatic polyisocyanates containing 6–20 carbon atoms (except carbon atoms in NCO group—the same applies hereinafter), such as 2,4- and/or 2,6-tolylenediisocyanates (TDI), crude TDI, diphenylmethane-2,4'- and/or 4,4'-diisocyanates (MDI), crude MDI or polymethylene polyphenylenepolyisocyanates (PAPI) obtained by phosgenation of crude diaminodiphenyl methane (condensation products of formaldehyde with aromatic amine (such as aniline) or a mixture thereof, or mixture of diamino-diphenyl metane and minor amount (such as 2–20 weight %) of polyamine of 3 or higher functionality.

Aliphatic polyisocyanates containing 2–18 carbon atoms, such as hexamethylenediisocyanate and lysine diisocyanate.

Alicyclic polyisocyanates containing 4–15 carbon atoms, such as isophorone diisocyanate and dicyclohexylmethane diisocyanates.

Araliphatic polyisocyanates containing 8–15 carbon atoms, such as xylylene diisocyanates.

Modified polyisocyanates of these polyisocyanates containing urethane, carbodiimide, allophanate, urea, biuret, urethdione, urethonimine, isocyanurate and/or oxazolidone groups; i.e., examples of modified polyisocyanates containing a urethane group include an NCO prepolymer obtained by the reaction of a polyisocyanate such as TDI and a polyol such as polyether polyol under existence of excess amount of NCO group.

Polyisocyanates disclosed in JP-A-61-76517 other than the above-mentioned polyisocyanates.

A mixture of two or more kinds of the above-mentioned polyisocyanates.

Among these examples, polyisocynates commercially easily obtainable are preferable. Examples thereof include:
  TDI including 2,4- and 2,6-isomers, and a mixture thereof.
  Crude TDI
  MDI including 4,4'- and 2,4'-isomers, and a mixture thereof.
  Crude MDI or PAPI.

Modified polyisocyanates derived from above mentioned polyisocyanates, containing urethane, carbodiimide, allophanate, urea, biuret or isocyanurate groups.

The sealing material of the present invention comprises materials having a resin formation property. Furthermore, by adding a foaming agent and optionally a catalyst and/or a foam stabilizer to the dispersion (1) and the organic polyisocyanate (2), a material with the urethane foam formation property can be provided. These components can be included in either of the A liquid or the B liquid in consideration of the stability thereof. Or these can be mixed with both the A liquid and the B liquid in use.

Examples of foaming agents include methylene chloride, monofluorotrichloromethane and water.

As a catalyst, catalysts generally used in the polyurethane reaction can be employed. Examples of catalysts include amine catalysts (such as tertiary amines including triethyleneamine and N-ethylmorpholine); organo tin compounds (such as tin (II) octylate (stannous octylate) and dibutyltin dilaurate; and other organo metal compounds (such as lead octylate). The amount of the catalysts based on the total weight of the dispersion (1) and the organic polyisocyanate (2) is about 0.001 to 5%.

Examples of foam stabilizers include silicone surface active agents (polysiloxane-polyoxyalkylene copolymers).

Other examples of additives optionally added into the sealing material of the present invention include known additives such as flame retardants, reaction retarders, colorants, internal mold release agents, age resistors, antioxidants, plasticizers, germicides, carbon black and other fillers.

The isocyanate index in the sealing materials of the present invention is calculated by the formula: (equivalent ratio of NCO/active hydrogen atom-containing group)× 100). The isocyanate index is, in general, 80 to 140, preferably 85 to 120, more preferably 95 to 115. It is also feasible to have the isocyanate index much higher than the above-mentioned range, such as 300 to 1,000 or higher and introduce polyisocyanurate into the polyurethane.

Methods of applying the sealing materials of the present invention as a water preventing material to cables are not particularly limited. Examples thereof include the following two methods.

① Mix a component (A) comprising a water absorbent dispersion (1) and a component (B) comprising an organic polyisocyanate (2) quickly and introduce the mixed liquid into an opening space in the cable under pressure. Leave it for curing to form a polyurethane resin.

② Mix a component (A) and a component (B) and leave for curing in a mold to obtain a string-like or tape-like molded product.

Then insert it into an opening space in the cable.

A polyurethane resin is formed in the opening space in a cable in a method of ① or ② with a sealing material of the present invention. At the time, the component (A) may be reacted with the component (B) optionally after removing water and optionally in the presence of a foaming agent, a catalyst, or a foam stabilizer. The sealing materials of the present invention are for the application in a cable such as an electric cable or an optical fiber cable. In particular, they are preferable for the application as the water preventing material in an optical fiber cable.

FIG. 1 is a cross-sectional view of an embodiment of an optical fiber cable of the present invention. In FIG. 1, the numeral 1 denotes a polyurethane resin layer formed with a sealing material of the invention, 2 an optical fiber, 3 a cable sheath, 4 a tension member, 5 a slot type spacer, and 6 a binding tape.

In FIG. 1, when the polyurethane resin layer (1) is a polyurethane foam layer, an example of a method of forming the layer is as follows. Using a two-component reaction injection molding machine, water-absorbent resin dispersion (1) including a foaming agent and an organic polyisocyanate (2) are mixed quickly, and the fluid mixture is injected under pressure into an opening of the cable, and it is cured. Accordingly, the polyurethane foam layer is formed.

Since an optical fiber cable using a sealing material of the present invention as illustrated in FIG. 1 comprises a sealing material providing an excellent water absorbency having a polyurethane resin layer wherein fine particles of water absorbent resin are homogeniously dispersed, when the cable sheath cracks and water enters the cable, the water preventing material absorbs water and swells quickly so as to fill up the space of the cable and prevent a penetration of water. Furthermore, the cable enables an easy operation in connecting the cable since the sealing material does not fall off.

Hereinafter the present invention will be further explained with reference to results of performance evaluation of syntheses examples of the sealing materials and examples of polyurethane resins formed with the sealing materials. However, the present invention is not limited thereto. Hereinafter "part" denotes weight part. Chemical compositions and testing methods used in Syntheses Examples 1–3, Examples 1–3, and Comparative Examples 1–2 are as follows.

Vinyl monomer (1): Acrylic acid (produced by NIPPON SHOKUBAI CO., LTD.)

Copolymerizable crosslinking agent (2): methylene bisacryl amide (produced by NITTO CHEMICAL INDUSTRY CO., LTD.)

Radical polymerization catalyst: 2,2'-azobis(2-aminodipropane)dihydrochloride

Emulsifier: sorbitan laurate monoester

Amine catalyst; triethylene diamine (DABCO)

Tin catalyst: stannous octoate (T-9)

Isocyanate: trilene diisocyanate (TDI-80)

Foam stabilizer: silicone type foam stabilizer ("L-520" produced by NIPPON UNICAR CO., LTD. [Particle size measurement method based on the volume]

A water absorbent resin dispersion is diluted with the polyoxyalkylene compound used in the water absorbent resin dispersion so that the transmissivity of a laser beam becomes 70 to 90%. Then the particle size was measured with a particle size distribution measurement device (laser diffraction/scattering particle size distribution measurement device LA-700; produced by HORIBA, LTD.). The measured particle sizes are shown in Table 2. The value of the particle size in Table 2 is a particle size corresponding to 50% cumulative distribution of the volume standard particle size distribution.

Artificial sea water absorbency and absorbing rate were measured by the following methods.

[Absorbency] 10 g of an absorbent material (urethane resin formed from the present sealing material) was placed in a 250-mesh nylon net tea bag and soaked in a great amount of artificial sea water ("Aquamarine" produced by YASHIMA YAKUHIN CO., LTD.) for one hour for absorption. Then the bag was drained for 15 minutes and the increased weight was measured. The value was defined as the absorbency.

[Absorption rate] 10 g of an absorbent material (polyurethane resin formed from the present sealing material) was placed in a 250-mesh nylon net tea bag and soaked in a great amount of artificial sea water for two minutes for absorption. Then the bag was drained for 15 minutes and the increased weight was measured. The value was defined as the absorbency rate.

Synthesis Example 1

350 parts of a 25 weight % aqueous solution of sodium hydroxide and 200 parts of a vinyl monomer (1) ("acrylic acid" produced by NIPPON SHOKUBAI CO., LTD.) were mixed in a 2 litter four-neck flask having a temperature controller, a vacuum stirrer, an inlet and an outlet for nitrogen at 40° C. or lower. Then 0.02 part of copolymerizable crosslinking agent (2) ("methylene bis-acrylamide") produced by NITTO CHEMICAL INDUSTRY CO., LTD.) was added thereto and mixed to obtain a homogeneous solution (①).

On the other hand, 400 parts of polyoxyalkylene compound (A) having a hydroxyl value of 34 (polyetherpolyol prepared by adding propylene oxide (PO) to glycerin and then adding ethylene oxide (EO) : ethylene oxide content 20 weight % ("SANNIX KC-209" produced by Sanyo Chemical Industries, Ltd.)), 4 parts of emulsifier ("EMULMIN 140" produced by Sanyo Chemical Industries, Ltd.) were mixed in a 500-ml Erlenmeyer flask and a homogeneous solution (②) was prepared. Subsequently the solution (①) was stirred under nitrogen gas bubbling condition at 40° C. or lower, and the solution (②) was taken into the vessel continuously for an hour to prepare a W/O type emulsion.

And 0.02 part of radical polymerization catalyst ("ADVN" produced by OTSUKA CHEMICAL CO., LTD.) dissolved in 0.1 part of toluene was added to the solution and heated at 50° C. with stirring. Thus water absorbent resin dispersion (D1) was synthesized.

Synthesis Example 2

Under the same conditions as Synthesis Example 1 except that the polyoxyalkylene compound was substituted with 600 parts of a polyoxyalkylene chain-containing compound having hydroxyl value of 50 (polyetherpolyol prepared by adding propylene oxide to glycerin and then adding ethylene oxide; ethylene oxide content 70 weight %), a water absorbent resin dispersion (D2) was synthesized.

Synthesis Example 3

Under the same conditions as Synthesis Example 1 except that 2-acrylamide-2-methyl propane sulfonic acid was used as the vinyl monomer, a water absorbent resin dispersion (D3) was synthesized.

The particle size and viscosity of the dispersions D1 to D3 obtained in Syntheses Examples 1 to 3 are shown in Table 1.

TABLE 1

|  | Average particle size based on the volume ($\mu$m) | Viscosity (cps/25 °C.) |
| --- | --- | --- |
| Dispersion 1 | 0.88 | 8200 |
| Dispersion 2 | 1.27 | 5200 |
| Dispersion 3 | 0.52 | 4800 |

EXAMPLES 1 to 3

Dispersions obtained in Syntheses Examples 1 to 3, water, DABCO and L-520 were mixed in an amount shown in Table 2, and adjusted to about 25° C.

Then stannous octate (T-9) was added to the liquid and mixed for 10 seconds, so liquid A was obtained. And liquid B comprising of tolylene diisocyanate (TDI-80) controlled to 25° C. was added and mixed for 7 seconds. Thus polyurethane resin-formable sealing materials for cable : F-1 to F-3 were prepared. The obtained material was a water absorbent polyurethane foam. The foam properties (Density, Absorbency of artificial sea water, absorbent rate of artificial sea water) of the foam are shown in Table 3.

TABLE 2

|  |  | Example 1 (F1) | Example 2 (F2) | Example 3 (F3) |
| --- | --- | --- | --- | --- |
| A liquid | Dispersion 1 | 92.5 | — | — |
|  | Dispersion 2 | — | 92.9 | — |
|  | Dispersion 3 | — | — | 91.8 |
|  | Water | 0.2 | 0.1 | 0.1 |
|  | DABCO | 0.1 | 0.1 | 0.1 |
|  | L-520 | 1.0 | 1.0 | 1.0 |
|  | T-9 | 0.09 | 0.05 | 0.14 |
| B liquid | TDI-80 | 6.2 | 5.9 | 6.9 |

TABLE 3

|  | Sealing material density (g/cm$^3$) | Absorbency (g/g) | Absorption rate (g/g) |
| --- | --- | --- | --- |
| F1 | 0.23 | 19 | 18 |
| F2 | 0.48 | 23 | 22 |
| F3 | 0.39 | 31 | 30 |

With the sealing materials of the present invention, an excellent absorption polyurethane resin is provided, having a water absorbent resin homogeneously dispersed as fine particles of 100 $\mu$m or smaller. The obtained polyurethane resin shows an excellent absorption ability (water absorption, absorption rate).

Since the sealing materials of the present invention have the above-mentioned advantages, they have excellent water preventing property when used in a communication cable or an optical fiber cable. Furthermore, since the sealing material does not tend to fall off in the cable connection operation, they provide excellent operativity.

The invention may be embodied in other forms without departing from the spirit or essential characteristics thereof. The embodiments disclosed in this application are to be considered in all respects as illustrative and not restrictive. The scope of the invention is indicated by the appended claims rather than the foregoing description, and all changes that come within the meaning and range of equivalency of the claims are intended to be embraced therein.

We claim:

1. A cable whose inner opening space has been sealed with a polyurethane resin formed from a polyurethane resin-forming sealing material comprising components (A) and (B):

(A): a component comprising a dispersion (1) of at least one selected from the group consisting of (a) a water-insoluble water absorbent resin (D) and (b) a hydrogel of said resin (D) in a polyol (C), wherein said resin (D) is formed by polymerizing in the polyol (C) a water soluble monomer or a precursor thereof and at least one selected from the group consisting of a crosslinking agent and a polysaccharide; and (B): a component comprising an organic polyisocyanate (2).

2. The cable according to claim 1, wherein said cable is an optical fiber cable comprising an outer sheath, an optical fiber and said polyurethane resin between the outer sheath and the optical fiber.

3. The cable according to claim 1, wherein the polyol (C) is at least one selected from the group consisting of polyether polyol, polyester polyol, polybutadiene polyol, polyvinyl alcohol and acryl polyol.

4. The cable according to claim 1, wherein the ratio of (D) based on the total weight of the polyol (C) and the water-insoluble water-absorbent resin (D) is 1 to 70%.

5. The cable according to claim 1, wherein the average particle size of the water-insoluble water-absorbent resin (D) or the hydrogel thereof dispersed in the polyol (C) is 0.01 to 100 μm.

6. The cable according to claim 1, wherein said resin dispersion (1) is dispersion of the water-insoluble water absorbent resin (D) or hydrogel thereof in the polyol (C), which is produced by the polymerization of at least one kind of vinyl monomers having a carboxyl group, sulfonic group or a cationic group, a copolymerizable crosslinking agent and optionally another vinyl monomer in the polyol (C) in the presence of water.

7. The cable according to claim 1, wherein said sealing material comprises said dispersion (1), said polyisocyanate (2), and at least one selected from the group consisting of a forming agent and a form stabilizer as needed, and said sealing material is capable of forming a polyurethane resin.

8. A sealing process of an opening space inner a cable comprising mixing components (A) and (B) as described in claim 1 and introducing the resulted mixture into said opening space under pressure, followed by curing to form a polyurethane resin, whereby sealing the opening space.

9. A process of sealing an opening space in a cable comprising inserting in the opening space a string-like or tape-like molded polyurethane formed from the polyurethane resin-forming sealing material as described in claim 1, thereby sealing the opening space.

* * * * *